C. P. VAILL.
RAIL BOND.
APPLICATION FILED AUG. 28, 1912.
1,157,603.
Patented Oct. 19, 1915.
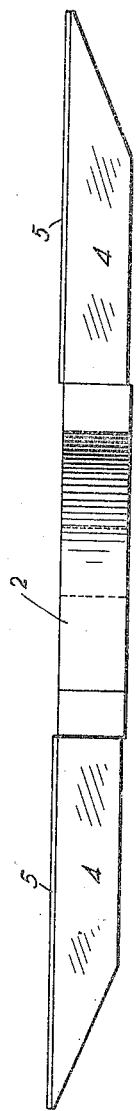
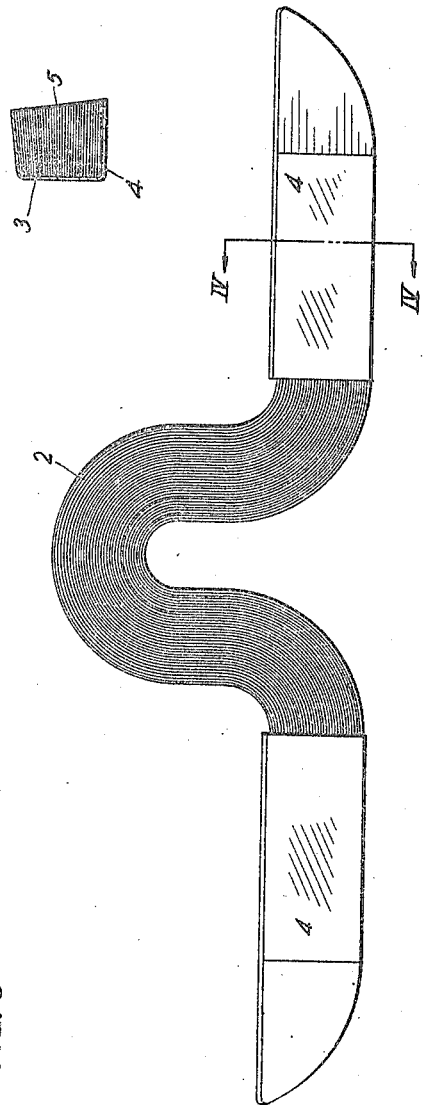
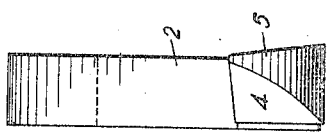
WITNESSES
INVENTOR

UNITED STATES PATENT OFFICE.

CHARLES P. VAILL, OF WORCESTER, MASSACHUSETTS, ASSIGNOR TO THE AMERICAN STEEL & WIRE COMPANY OF NEW JERSEY, OF HOBOKEN, NEW JERSEY, A CORPORATION OF NEW JERSEY.

RAIL-BOND.

1,157,603.

Specification of Letters Patent.

Patented Oct. 19, 1915.

Application filed August 26, 1912. Serial No. 717,488.

*To all whom it may concern:*

Be it known that I, CHARLES P. VAILL, a citizen of the United States, residing at Worcester, in the county of Worcester and State of Massachusetts, have invented a new and useful Rail-Bond, of which the following is a specification.

My invention relates to the construction of rail bonds used in connecting the ends of the rails of electrically operated railways, and more particularly relates to the construction of the bonds for third rails in which the bond terminals are soldered to the ends of the rails.

One object of my invention is to provide a rail bond of improved construction having novel means by which the terminals are attached or secured to the rails to which they are applied for use, and another object of this invention is to provide a rail bond having bond terminals of novel construction whereby the electrical efficiency of the bond is improved and a perfect electrical contact with the rail is obtained.

Referring to the accompanying drawings forming part of this specification, Figure 1 is a plan showing a rail bond having terminals constructed and arranged in accordance with my invention. Fig. 2 is a side elevation of the same. Fig. 3 is an end elevation of the construction shown in Figs. 1 and 2. Fig. 4 is a sectional end elevation on the line IV—IV of Fig. 1.

In the drawings 2 designates the flexible member or conductor of the bond which is made up of a series of thin, flat metallic strips, copper being the material preferably employed in forming the conductor.

The ends of the conductor 2 have bond terminals 3, 3, the ends of the strips forming the terminals being incased on three sides with an enveloping sheath or sleeve 4 and the so-covered ends of the strips are then then heated and welded together so as to form a rail bond having substantially solid end portions forming the terminals 3, 3 connected together by a series of separate and independent leaves or laminations formed of the flat, thin strips of which the flexible conductor 2 is composed.

The side 5 of the terminals 3, or side which is in contact with the rails in soldering or welding the bonds to the rails in connecting the rails, is not covered with the sleeve 4 so that the body of the rail bond terminals 3 or edge portions of the strips forming the terminals 3 engage directly with the surfaces of the rail ends to which the bond is applied for use.

The contacting surface 5 of the bond terminals 4 is flared outwardly so as to extend at an angle to the plane of the side of the connector formed by the laminations or strips 2. After the bond is formed as has been described the terminals 3 are tinned prior to affixing the rail bonds to the rails or other place of use to facilitate the soldering operation, when the bonds are to be soldered in place.

The advantages of my invention will be apparent to those skilled in the art. By enveloping the ends or terminals of the bond with a sleeve or sheath on three sides of the bond, the mechanical efficiency of the bond is greatly improved while by omitting the sheath or sleeve on the side of the terminals which contacts with the rails in attaching the bonds to the rails, the electrical efficiency of the rail bond is materially increased.

Modifications in the construction of the laminated conductor and in the form and size of the terminals of the bonds may be made without departing from my invention as defined in the claims.

I claim:—

1. A rail bond having a laminated conductor with the ends of the laminæ welded together to form solid terminals on the ends of the bond, and having an envelop or sheath welded to and covering the terminals, the edges of the laminæ on one side of the terminals forming a flat plane surface and being exposed to permit direct contact of the edge of each lamination with the rails to which the bond is applied.

2. A rail bond having a laminated conductor with the ends of the laminæ welded together to form solid terminals on the ends of the bond, and having an envelop or sheath covering the terminals, the edges of the laminæ on one side of the terminals forming a flat plane surface and being exposed to permit direct contact of the edge of each lamination with the rails to which the bond is applied.

In testimony whereof, I have hereunto set my hand.

CHARLES P. VAILL.

Witnesses:
OTTO F. BECKLUND,
JAMES P. FOLEY.